US011807077B2

(12) United States Patent
Watanabe et al.

(10) Patent No.: US 11,807,077 B2
(45) Date of Patent: Nov. 7, 2023

(54) AIR-CONDITIONING REGISTER

(71) Applicant: TOYODA GOSEI CO., LTD., Kiyosu (JP)

(72) Inventors: Hiroto Watanabe, Kiyosu (JP); Hitoshi Fujisawa, Kiyosu (JP); Tatsuya Tanikawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 111 days.

(21) Appl. No.: 17/408,688

(22) Filed: Aug. 23, 2021

(65) Prior Publication Data
US 2022/0063380 A1    Mar. 3, 2022

(30) Foreign Application Priority Data

Aug. 31, 2020  (JP) ................................. 2020-145215

(51) Int. Cl.
*B60H 1/34*    (2006.01)
*B60H 1/00*    (2006.01)

(52) U.S. Cl.
CPC ......... *B60H 1/3421* (2013.01); *B60H 1/0065* (2013.01); *B60H 1/00671* (2013.01); *B60H 2001/3478* (2013.01)

(58) Field of Classification Search
CPC ........................... B60H 1/3421; B60H 1/0065; B60H 1/00671; B60H 2001/3478; B60H 2001/3741
(Continued)

(56) References Cited

U.S. PATENT DOCUMENTS 3,602,127 A  *  8/1971  Walker ................. B60H 1/3428
                                                           454/316
6,059,376 A  *  5/2000  Shryock .................... B60B 7/10
                                                           301/37.109
(Continued)

FOREIGN PATENT DOCUMENTS

CN    101722918 B  *  5/2014  ........... B60N 2/2809
JP    H10-272918 A     10/1998
(Continued)

OTHER PUBLICATIONS

Office Action dated Apr. 25, 2023 issued in corresponding Japanese Patent Application No. 2020-145215 (and English machine translation).

*Primary Examiner* — Allen R. B. Schult
*Assistant Examiner* — William C Weinert
(74) *Attorney, Agent, or Firm* — POSZ LAW GROUP, PLC

(57) ABSTRACT

An air-conditioning register includes: a movable fin; an operation knob; and a transmission mechanism. A load generating mechanism is provided in a middle of a force transmission path in the transmission mechanism. The load generating mechanism includes a pressure receiving portion, a pressing member, and a spring. The pressure receiving portion has a pressure receiving surface. The pressing member rotates with respect to the pressure receiving portion as the operation knob rotates. The spring generates a load between the pressing member and the pressure receiving portion by urging the pressing member toward a side approaching the pressure receiving surface and pressing the pressing member against the pressure receiving surface. The pressing member and the pressure receiving portion are each formed of a hard resin material, and the pressing member is
(Continued)

directly in contact with the pressure receiving surface to generate the load.

6 Claims, 12 Drawing Sheets

(58) Field of Classification Search
USPC .......................................................... 454/155
See application file for complete search history.

(56) References Cited

U.S. PATENT DOCUMENTS

| | | | |
|---|---|---|---|
| 2011/0111685 A1* | 5/2011 | Benamira | B60H 1/3457 454/155 |
| 2012/0184197 A1* | 7/2012 | Mayer | B60H 1/00857 454/155 |
| 2017/0057328 A1* | 3/2017 | Sano | B60H 1/3442 |
| 2020/0047585 A1* | 2/2020 | Kawamoto | B60H 1/0065 |
| 2022/0097483 A1* | 3/2022 | Schaal | B60H 1/00857 |
| 2022/0145970 A1* | 5/2022 | Groben | B60H 1/34 |

FOREIGN PATENT DOCUMENTS

| | | |
|---|---|---|
| JP | H11-007332 A | 1/1999 |
| JP | 2017-43172 A | 3/2017 |

* cited by examiner

FIG.2
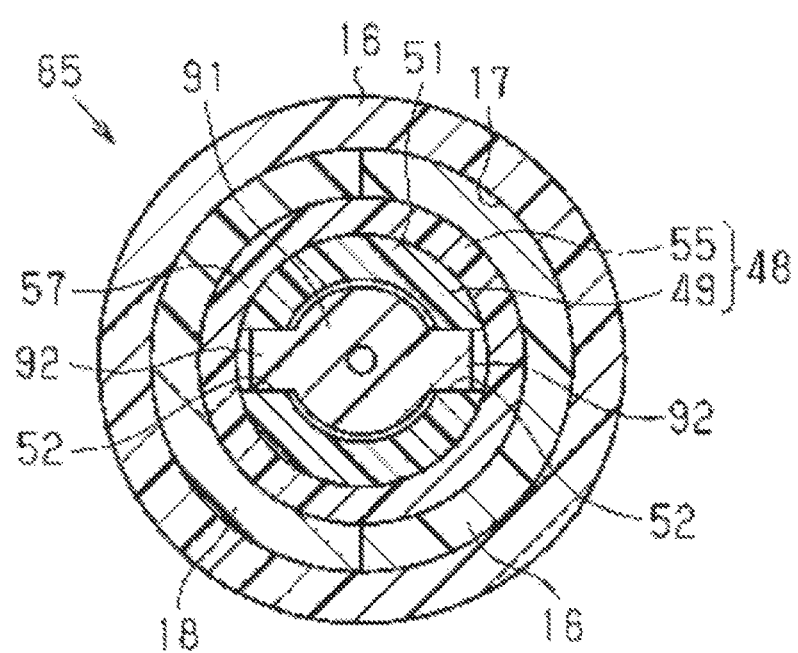
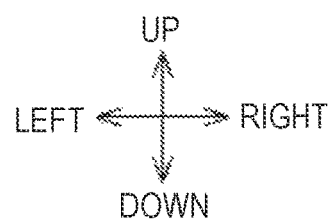

AIR-CONDITIONING REGISTER

CROSS-REFERENCE TO RELATED APPLICATION(S)

This application is based upon and claims the benefit of priority from prior Japanese patent application No. 2020-145215 filed on Aug. 31, 2020, the entire contents of which are incorporated herein by reference.

BACKGROUND

1. Field of the Invention

The present invention relates to an air-conditioning register which blows out air-conditioning air sent from an air conditioning device from an outlet of a ventilation passage.

2. Description of the Related Art

An instrument panel of a vehicle incorporates an air-conditioning register which blows out air-conditioning air sent from an air conditioning device from an outlet of a ventilation passage in a retainer. As one form of this air-conditioning register, as illustrated in FIG. 14, an air-conditioning register including a movable fin 202, an operation knob 203, and a transmission mechanism 204 is disclosed in JP-A-2017-43172. The movable fin 202 is arranged so as to be tiltable in a ventilation passage 201. The operation knob 203 is provided at least rotatably at a location away from the movable fin 202. The transmission mechanism 204 transmits the rotation of the operation knob 203 to the movable fin 202 to tilt the movable fin 202.

In an air-conditioning register 200 described above, a load generating mechanism 205 is provided in a middle of a force transmission path in the transmission mechanism 204. The load generating mechanism 205 includes a pressure receiving portion 207 with a pressure receiving surface 206, a pressing member 208 provided so as to be movable in a direction of approaching and separating from the pressure receiving surface 206, and a spring 209 which urges the pressing member 208 toward a side approaching the pressure receiving surface 206 and presses the pressing member 208 against the pressure receiving surface 206 to generate a load. In the pressing member 208 and the pressure receiving portion 207, sliding portions are formed by an elastic body 210. The elastic body 210 is formed of a material having rubber-like elasticity, for example, a soft material such as an elastomer or silicone rubber. Then, the elastic body 210 urged by the spring 209 via the pressing member 208 is pressed against the pressure receiving surface 206 or the pressing member 208. Due to this pressing, a load due to friction is generated between the elastic body 210 and the pressure receiving surface 206, or between the elastic body 210 and the pressing member 208. By this load, an operation load when rotating the operation knob 203 is applied. Further, a tilt load (torque) when tilting the movable fin 202 is applied.

However, in the air-conditioning register 200 described in JP-A-2017-43172, the elasticity of the elastic body 210 is easily affected by the air temperature. For example, in cold regions, the elastic body 210 is harder than in non-cold regions. Along with this, the operation load when rotating the operation knob 203 becomes larger in the cold region than in the non-cold region, and thus the operation feeling is lowered. A similar phenomenon can occur in the same area. This is because the elastic body 210 is harder in winter than in summer.

Contrary to the above, in the summer, the elastic body 210 becomes softer than in the winter. Along with this, a tilt load (torque) of the movable fin 202 becomes smaller in the summer than in the winter. When this tilt load (torque) becomes smaller than an appropriate value, the movable fin 202 is tilted by the air-conditioning air A1 flowing through the ventilation passage 201. As a result, it becomes difficult to hold the movable fin 202 at the tilt angle set by an operation of the operation knob 203. For example, there is a concern that the movable fin 202, which is stationary at an intermediate tilt angle, will tilt.

SUMMARY

The invention is made in view of such circumstances and an object thereof is to provide an air-conditioning register capable of stabilizing a load generated by a load generating mechanism.

According to an aspect of the invention, there is provided an air-conditioning register including: a movable fin which is tiltably placed in a ventilation passage for air-conditioning air in a retainer; an operation knob provided at least rotatably at a location away from the movable fin; and a transmission mechanism which transmits rotation of the operation knob to the movable fin and tilts the movable fin, where: a load generating mechanism is provided in a middle of a force transmission path in the transmission mechanism, the load generating mechanism includes a pressure receiving portion, a pressing member, and a spring; the pressure receiving portion has a pressure receiving surface: the pressing member rotates with respect to the pressure receiving portion as the operation knob rotates; the spring generates a load between the pressing member and the pressure receiving portion by urging the pressing member toward a side approaching the pressure receiving surface and pressing the pressing member against the pressure receiving surface; and the pressing member and the pressure receiving portion are each formed of a hard resin material and the pressing member is directly in contact with the pressure receiving surface to generate the load.

According to the configuration described above, in the load generating mechanism, the pressing member urged by the spring is pressed against the pressure receiving surface of the pressure receiving portion. A load due to friction is generated between the pressing member and the pressure receiving surface.

The air-conditioning air supplied to the retainer tries to tilt the movable fin. In this case, when the force applied from the air-conditioning air to the movable fin does not overcome the friction described above, the movable fin is not tilted and is maintained at the tilt angle at that time. The same applies when a force for rotating the operation knob is applied to the operation knob and the force does not overcome the friction. The operation knob is not rotated.

A force is applied to the operation knob to rotate it, and when that force overcomes the friction described above, the operation knob rotates and, at the same time, the pressing member rotates with respect to the pressure receiving portion in a state where the pressing member is pressed against the pressure receiving surface. In addition, the rotation of the operation knob is transmitted to the movable fin via the transmission mechanism and the movable fin is tilted.

Here, according to the configuration described above, the pressing member and the pressure receiving portion are each formed of a hard resin material and the pressing member is in direct contact with the pressure receiving surface. The pressing member and the pressure receiving portion are less susceptible to the influence of air temperature than when an elastic body is interposed between the pressing member and the pressure receiving portion. Therefore, even when the air-conditioning register is used at the times of different air temperatures or in areas with different air temperatures, the load generated by the load generating mechanism is stable.

In the air-conditioning register according to the aspect of the invention, the pressure receiving portion may have a cylindrical shape extending along a central axis of the ventilation passage and have a cylindrical inner wall surface, the pressure receiving portion may have the pressure receiving surface on its inner wall surface, inside the pressure receiving portion, a damper drive which extends along the central axis and which rotates by receiving transmission of the rotation of the operation knob may be arranged to tilt the movable fin, the damper drive may have an accommodation portion extending in a radial direction of the damper drive, the accommodation portion may have an open end which is open and faces the pressure receiving surface at at least one end portion in the radial direction, and the pressing member and the spring ma be arranged in the accommodation portion.

According to the configuration described above, when the operation knob is rotated, the rotation is transmitted to the damper drive. The damper drive rotates inside the pressure receiving portion. The rotation of this damper drive is transmitted to the movable fin and the movable fin is tilted.

Within the accommodation portion of the damper drive, the pressing member is urged by spring to the side approaching the pressure receiving surface in the radial direction of the damper drive. A part of the urged pressing member is pushed out of the open end of the accommodation portion and pressed against the pressure receiving surface of the pressure receiving portion. A load due to friction is generated between the pressing member and the pressure receiving surface.

In the air-conditioning register according to the aspect of the invention, the accommodation portion may have the open ends at both end portions in the radial direction, one of the pressing members may be placed in the accommodation portion, and the spring may urge the pressing member to expose a part of the pressing member from one open end of the accommodation portion and press it against the pressure receiving surface.

According to the configuration described above, one pressing member is urged by spring to one side in the radial direction of the damper drive. A part of the pressing member is exposed from one open end of the accommodation portion and pressed against the pressure receiving surface. A load due to friction is generated at one location on the cylindrical pressure receiving surface.

In addition, when the pressing member and the spring are accommodated in the accommodation portion and these are incorporated into the pressure receiving portion, only one pressing member needs to be pushed into the accommodation portion, so that the incorporation work is easy.

In the air-conditioning register according to the aspect of the invention, the accommodation portion may have the open ends at both end portions in the radial direction, and the pressing members may be located at both end portions of the accommodation portion in the radial direction and the spring may be located between both pressing members in the accommodation portion.

According to the configuration described above, two pressing members placed in the accommodation portion are urged by the spring to move away from each other. A part of each pressing member is exposed from the open end of the accommodation portion and pressed against the pressure receiving surface. In the cylindrical pressure receiving surface, a load due to friction is generated at two locations located on opposite sides of each other in the radial direction with the damper drive interposed therebetween.

In the air-conditioning register according to the aspect of the invention, the spring may be composed of a coil spring, and the pressing member may include a pressing body portion arranged at a location adjacent to an end portion of the spring and an insertion portion extending radially from the pressing body portion and being inserted into the end portion of the spring.

According to the configuration described above, the pressing member is attached to the spring by inserting the insertion portion in the pressing member into the end portion of the spring. The pressing body portion of the pressing member described above is urged by the spring and pressed against the pressure receiving surface of the pressure receiving portion.

In the air-conditioning register according to the aspect of the invention, the movable fin may include a shut damper arranged further on an upstream side than the load generating mechanism in a flow direction of the air-conditioning air, and the shut damper may include a pair of damper plates which are tilted in opposite directions with a damper axis as a fulcrum by a force transmitted from the transmission mechanism to open and close the ventilation passage.

According to the configuration described above, when the operation knob is rotated, the rotation is transmitted to each of the pair of damper plates in the shut damper (movable fin) via the transmission mechanism. Each damper plate is tilted in opposite directions with the damper axis as a fulcrum to open and close the ventilation passage.

In the load generating mechanism, the pressing member urged by the spring toward the side approaching the pressure receiving surface is pressed against the pressure receiving surface of the pressure receiving portion and a load due to friction is generated between the pressing member and the pressure receiving surface.

With the air-conditioning register described above, the load generated by the load generating mechanism can be stabilized.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 2 is a cross-sectional view taken along the line 2-2 in FIG. 3;

DETAILED DESCRIPTION OF THE INVENTION

Hereinafter, an embodiment embodied in an air-conditioning register for a vehicle will be described with reference to FIGS. 1 to 12.

In the following description, a traveling direction (forward direction) of a vehicle is defined as a front, a reverse direction is defined as a rear, and a height direction is defined as an up-down direction. Further, regarding a vehicle width direction (left-right direction), a direction is defined based on the case where the vehicle is viewed from the rear.

In a passenger compartment, an instrument panel is provided in front of a front seats (driver's seat and passenger's seat) of the vehicle and air-conditioning registers are incorporated in a central portion, a side portion, and the like in the left-right direction thereof. Main functions of this air-conditioning register are to change a direction of air-conditioning air sent from an air-conditioning device and blown out from an outlet into the passenger compartment and to adjust an amount of the air-conditioning air blown out. Adjusting the blowout amount includes blocking the blowout.

Figure 1:
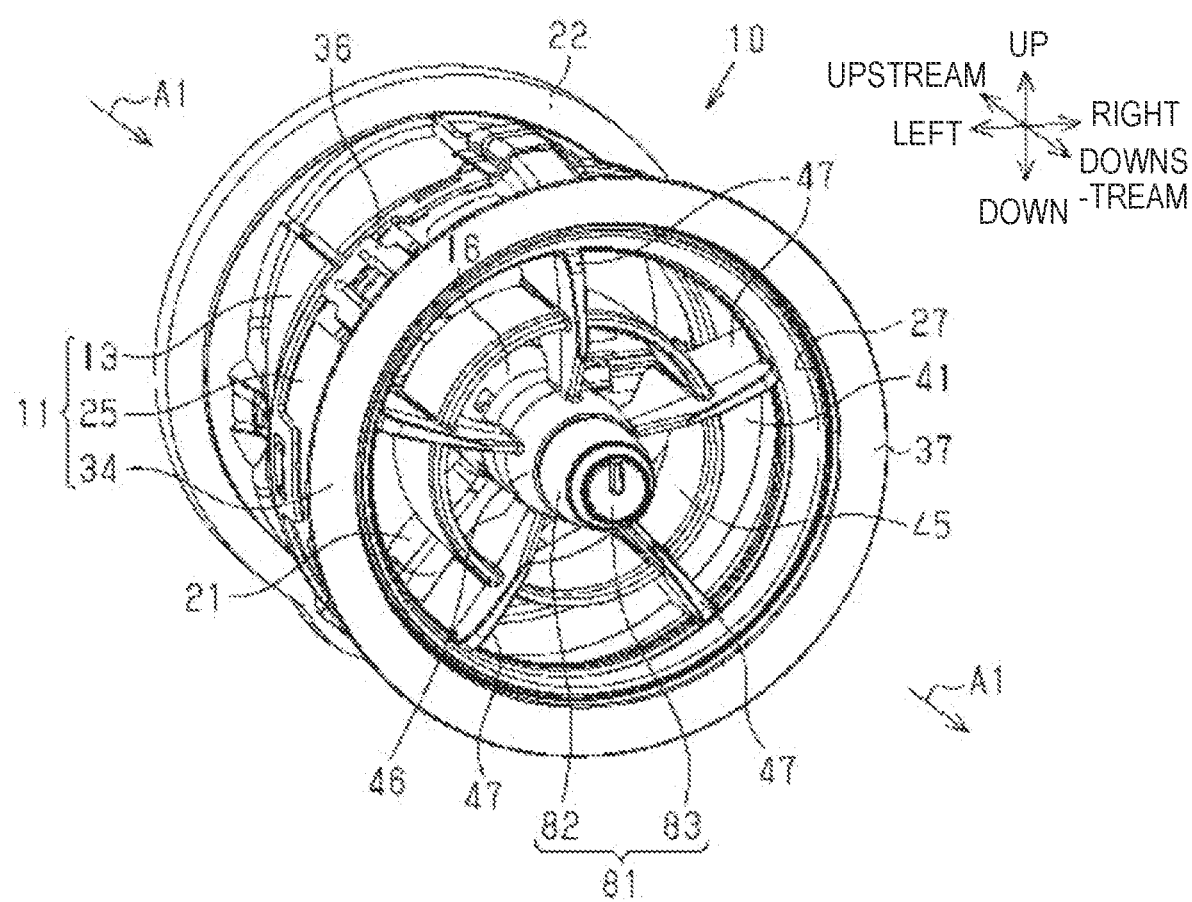
FIG. 1 is a perspective view of an air-conditioning register according to an embodiment.
Figure 3:
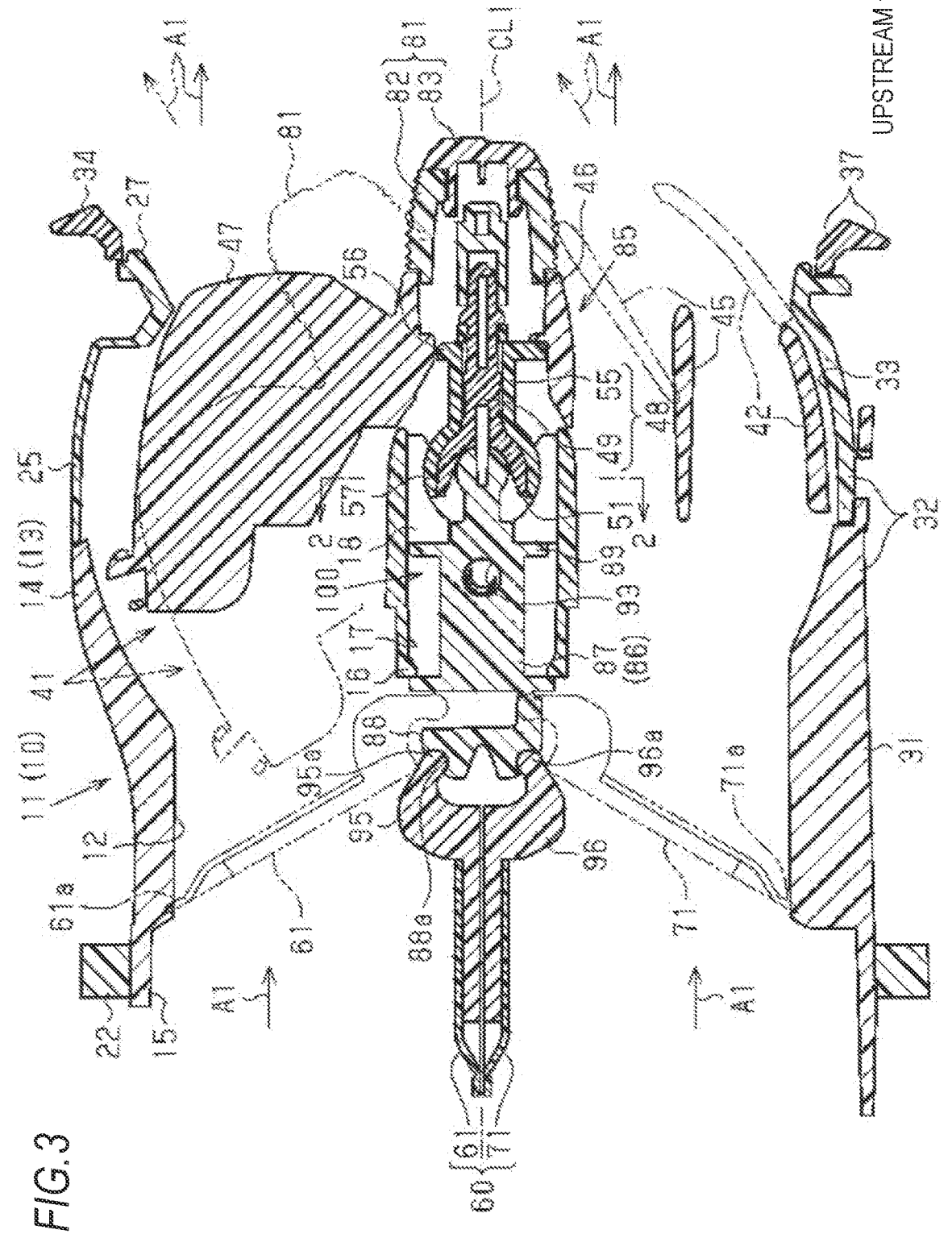
FIG. 3 is a side cross-sectional view of the air-conditioning register of FIG. 1.
Figure 4:
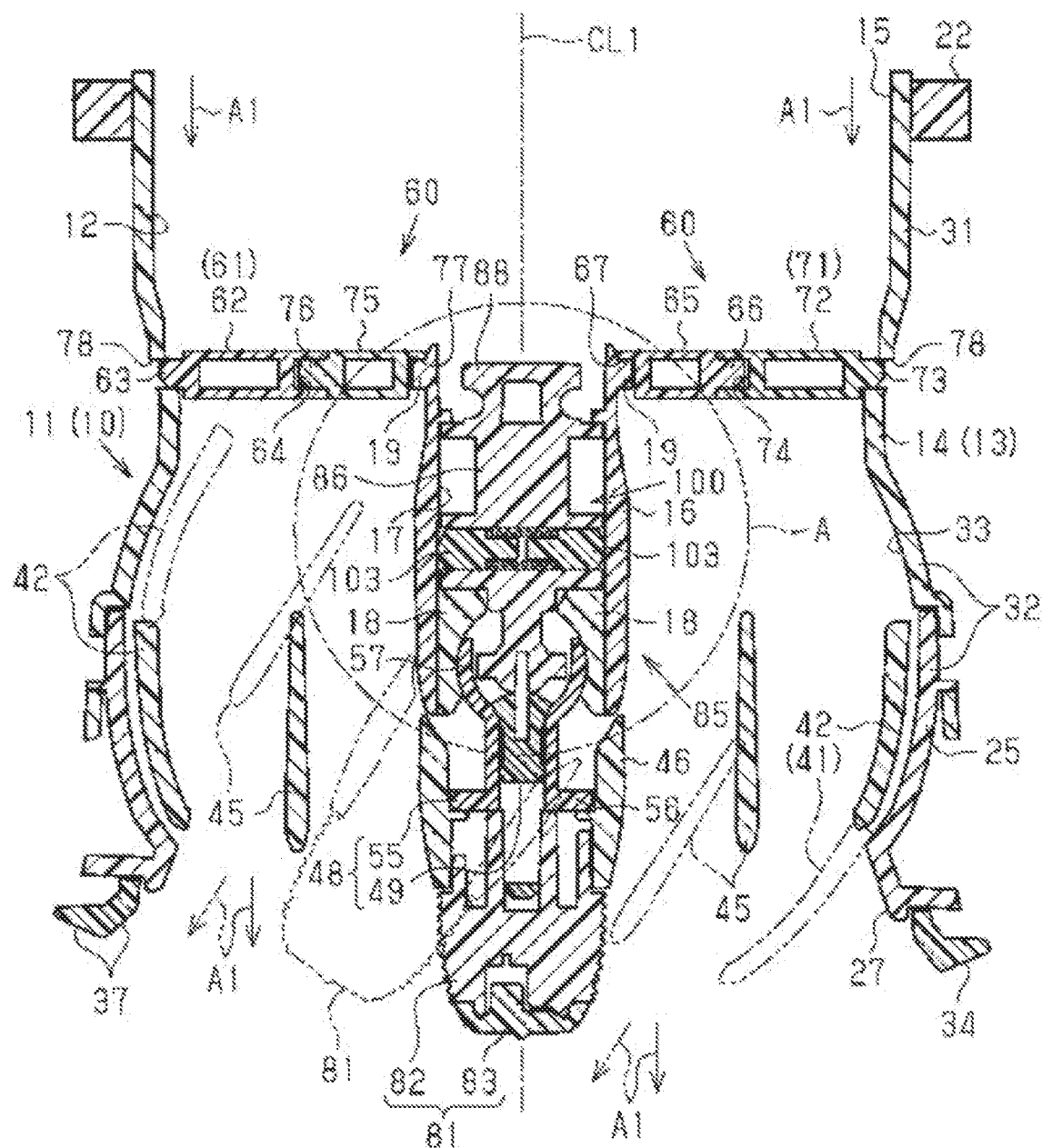
FIG. 4 is a plan cross-sectional view of the air-conditioning register of FIG. 1.

As illustrated in FIGS. 1, 3, and 4, an air-conditioning register 10 includes a retainer 11, a barrel 41, a shut damper 60, an operation knob 81, a transmission mechanism 85, and a load generating mechanism 100. Next, a configuration of each part of the air-conditioning register 10 will be described.

Retainer 11

Figure 6:
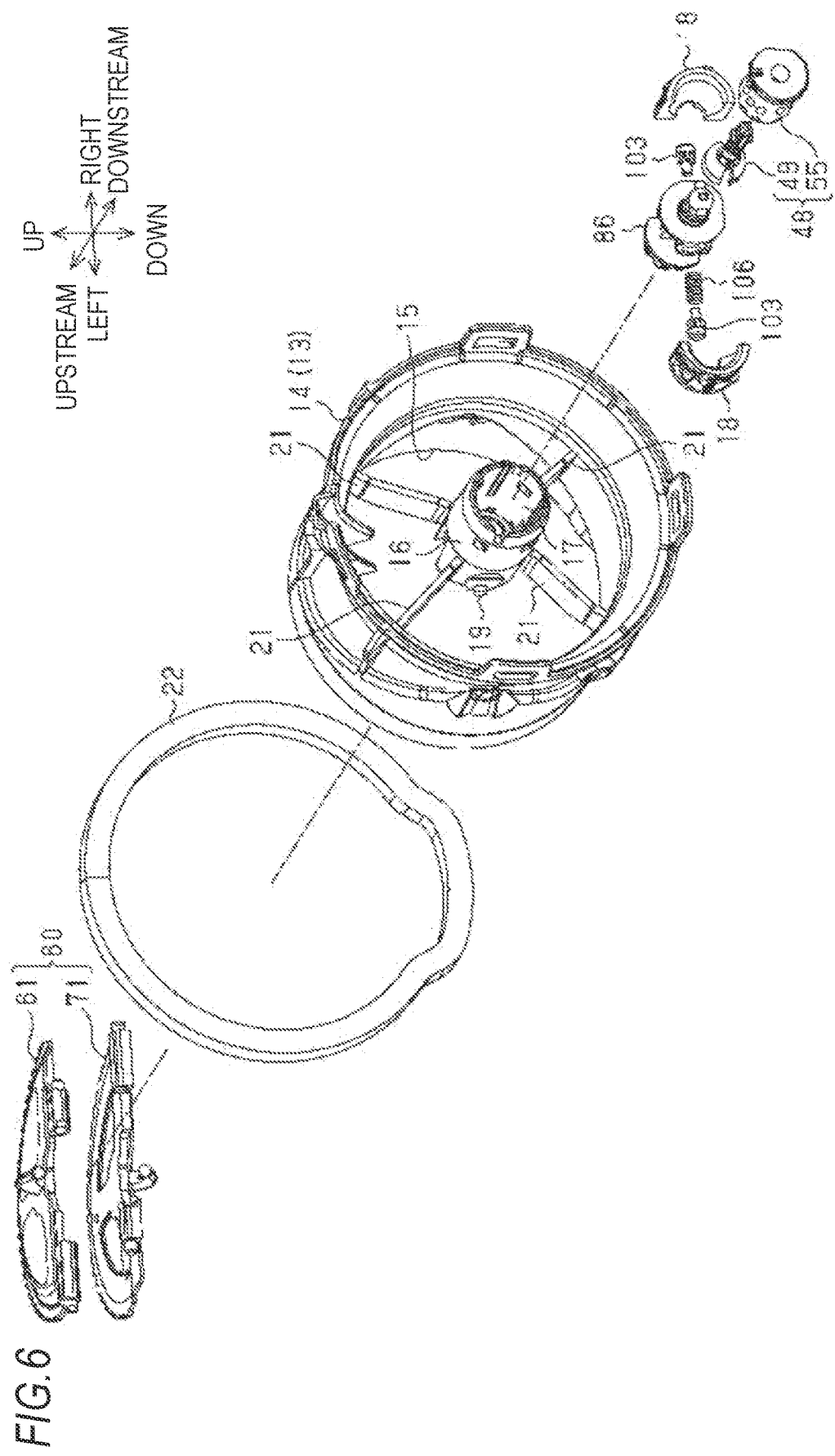
FIG. 6 is an exploded perspective view of some of the components of the air-conditioning register of FIG. 1.

As illustrated in FIGS. 3, 4, and 6, the retainer 11 is for connecting an air duct (not illustrated) of the air-conditioning device and an opening (not illustrated) provided in the instrument panel. An internal space of the retainer 11 forms a ventilation passage 12 for an air-conditioning air A1. Here, regarding a flow direction of the air conditioning air A1, a side closer to the air-conditioning device is referred to as "upstream", "upstream side", and the like and a side far from the air-conditioning device is referred to as "downstream", "downstream side", and the like.

The retainer 11 includes an upstream retainer component 13, a downstream retainer component 25, and a bezel 34. The upstream retainer component 13 is a member which forms an upstream portion of the retainer 11 and includes an outer cylinder portion 14, a damper base 16, and a support portion 21 (see FIG. 10).

The outer cylinder portion 14 has a cylindrical shape extending in the flow direction and having both ends open. The outer cylinder portion 14 has an inflow port 15 of the air-conditioning air A1 at the upstream end. The upstream end portion of the outer cylinder portion 14 is arranged in a state of being inserted into a downstream end portion of the air duct. An annular seal 22 made of an elastic material such as a sponge is arranged on an outer periphery of the upstream end portion of the outer cylinder portion 14. The seal 22 seals between the downstream end portion of the air duct and the upstream end portion of the upstream retainer component 13.

The damper base 16 has a cylindrical shape extending in the flow direction and having both ends open. The damper base 16 has a smaller diameter than the outer cylinder portion 14. The damper base 16 is located in a center of the outer cylinder portion 14 and extends along a central axis CL1 of the ventilation passage 12. The damper base 16 has a cylindrical inner wall surface 17. The damper base 16 is arranged so as to straddle the upstream retainer component 13 and the downstream retainer component 25 in the flow direction described above.

The support portions 21 extend radially outward from a plurality of locations in a circumferential direction of the damper base 16 and are connected to the outer cylinder portion 14. The damper base 16 is supported by the outer cylinder portion 14 by these support portions 21.

A pair of shims 18 are attached to a downstream portion of the damper base 16 (see FIG. 2). Both shims 18 have a function of bearings which tiltably support an outer shaft support portion 57 of an outer shaft portion 55, which will be described below (see FIG. 9).

Figure 9:
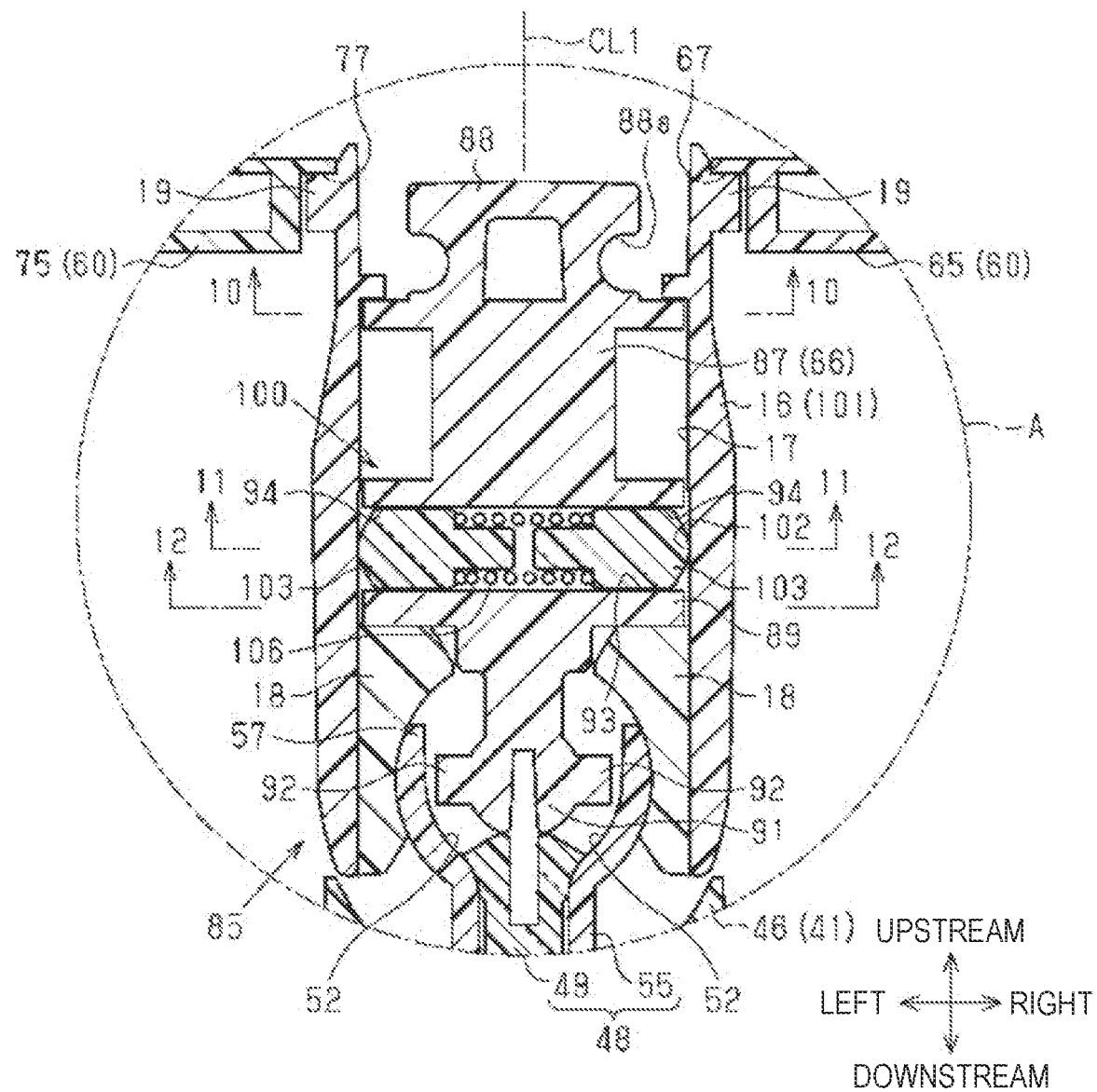
FIG. 9 is a partial plan cross-sectional view illustrating an enlarged part A in FIG. 4.
Figure 10:
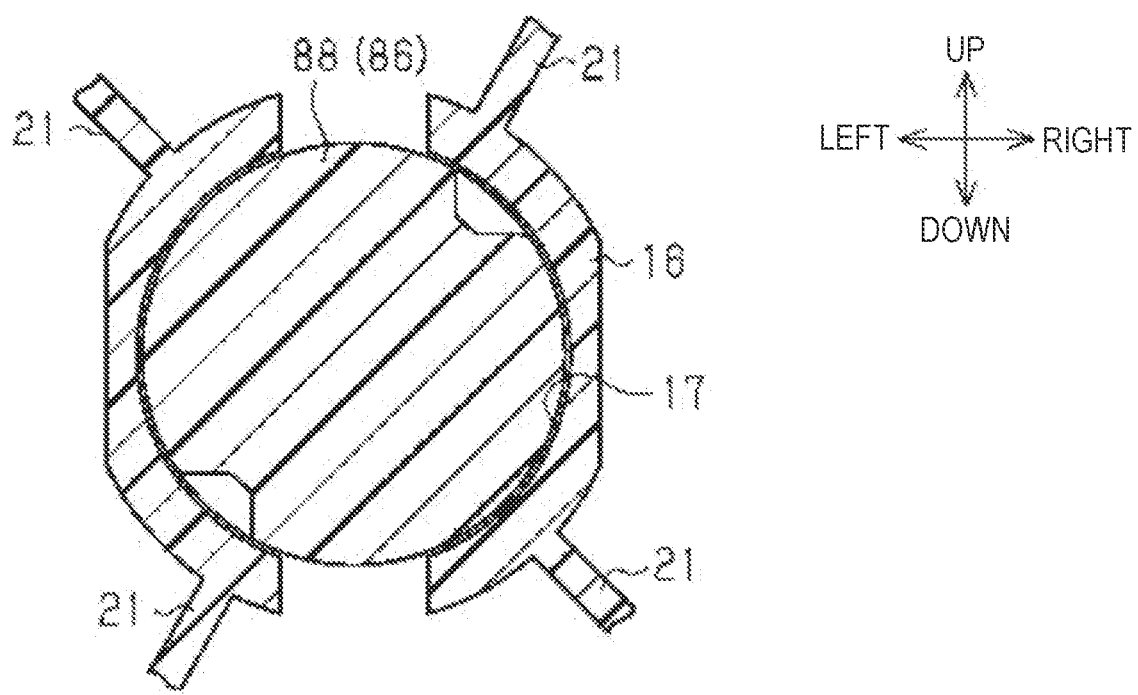
FIG. 10 is a cross-sectional view taken along the line 10-10 in FIG. 9.

On an outer peripheral surface of an upstream end portion of the damper base 16, a pair of shaft portions 19 projecting in opposite directions in a radial direction, and in the left-right direction in the embodiment, are formed (see FIG. 9).

The entire upstream retainer component 13, including the damper base 16, is made of a hard resin material. In the embodiment, acrylonitrile-butadiene-styrene copolymer resin (ABS) is used as the resin material, but other hard resin materials may be used.

Figure 5:
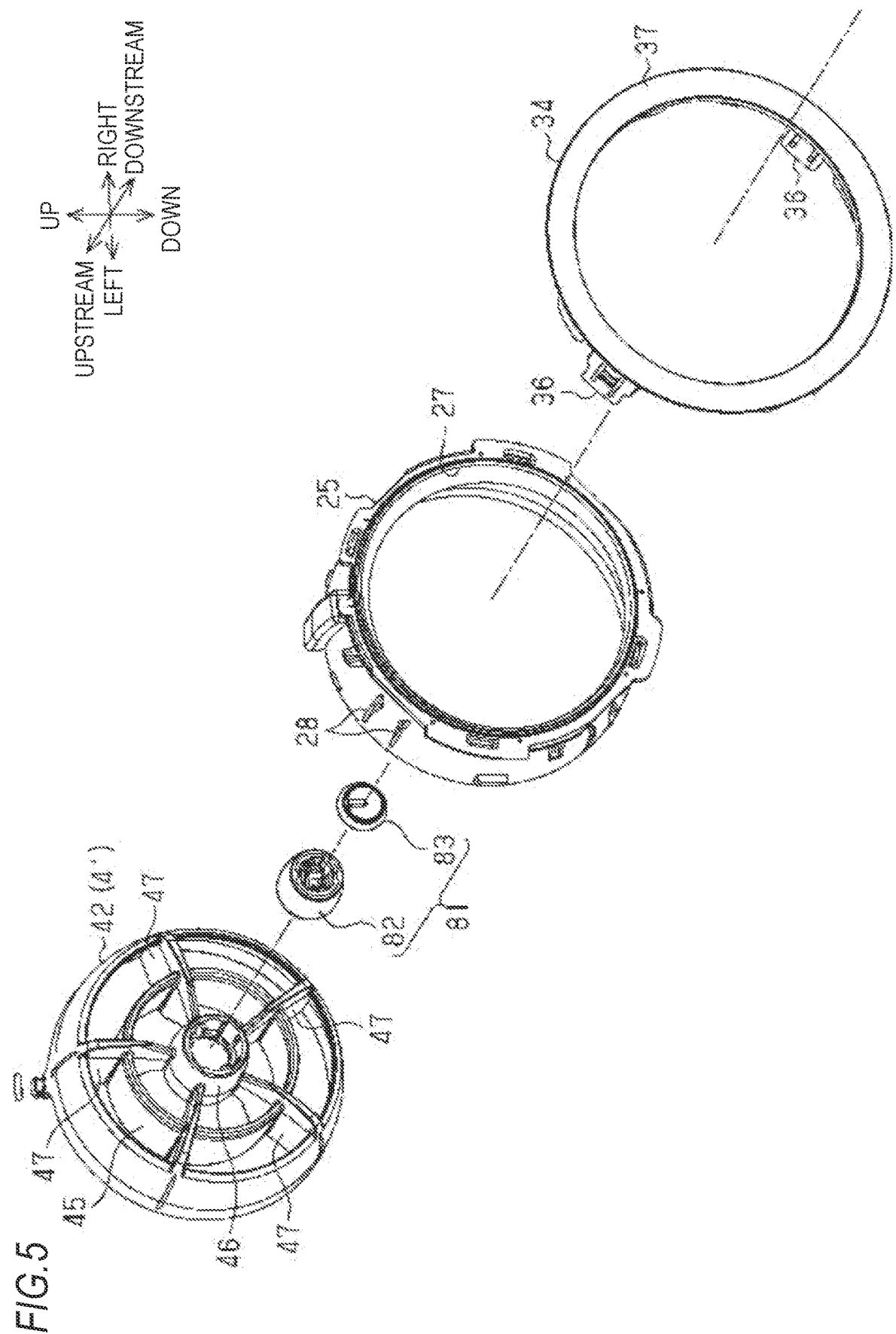
FIG. 5 is an exploded perspective view of some of components of the air-conditioning register of FIG. 1.

As illustrated in FIGS. 3 to 5, the downstream retainer component 25 is a member forming a downstream portion of the retainer 11. The downstream retainer component 25 has a cylindrical shape extending in the flow direction and having both ends open and is arranged at a location adjacent to the downstream side of the upstream retainer component 13. The downstream retainer component 25 has an outlet 27 for the air-conditioning air A1 at the downstream end portion. The downstream retainer component 25 is connected to the upstream retainer component 13 by connecting means (not illustrated) such as claw fitting.

From a functional point of view, the retainer 11 includes a general passage portion 31 and a barrel operating portion 32. The general passage portion 31 has a cylindrical shape and is composed of an upstream portion of the upstream retainer component 13. The barrel operating portion 32 is adjacent to a downstream side of the general passage portion 31. The barrel operating portion 32 is composed of a downstream portion of the upstream retainer component 13 and many portions excluding a downstream end portion of the downstream retainer component 25. An inner wall surface 33 of the barrel operating portion 32 is formed in a circular-arc cross-sectional shape which bulges outward in the radial direction over the entire circumference of the retainer 11 in the circumferential direction.

The bezel 34 is formed around a downstream end portion of the barrel operating portion 32 and forms an annular shape. Locking portions 36 having locking holes are formed at a plurality of locations separated from each other in a circumferential direction of the bezel 34. Locking protrusions 28 are formed on an outer peripheral surface of the downstream retainer component 25 at a plurality of locations separated from each other in the circumferential direction. Then, each locking protrusion 28 is locked in the locking hole of the corresponding locking portion 36, so that the bezel 34 is connected to the downstream retainer component 25. A downstream end surface of the bezel 34, a portion around the outlet 27, forms a design surface 37 of the air-conditioning register 10.

Barrel 41

The barrel 41 includes an outer barrel portion 42, an intermediate barrel portion 45, an inner barrel portion 46, and a plurality of support fin portions 47. The outer barrel portion 42, the intermediate barrel portion 45, and the inner barrel portion 46 each extend in the flow direction and have a cylindrical shape with both ends open. The outer barrel portion 42, the intermediate barrel portion 45, and the inner barrel portion 46 are formed so that their diameters decrease in this order and are arranged on concentric circles. The outer barrel portion 42 is curved so as to bulge outward in the radial direction.

The plurality of support fin portions 47 are provided at a plurality of locations in the circumferential direction of the intermediate barrel portion 45. Each support fin portion 47 extends both inward and outward in the radial direction of the intermediate barrel portion 45. An outer end portion of each support fin portion 47 in the radial direction is connected to the outer barrel portion 42. An inner end portion of each support fin portion 47 in the same radial direction is connected to the inner barrel portion 46.

The outer barrel portion 42, the intermediate barrel portion 45, the inner barrel portion 46, and each support fin portion 47 have a function of changing the flow direction of the air-conditioning air A1 by being tilted.

As illustrated in FIGS. 3, 4, and 9, the barrel 41 is supported by the inner barrel portion 46 so as to be tiltable with respect to the damper base 16. For this support, a shaft 48 is attached in a state of being inserted through the inner barrel portion 46. The shaft 48 includes an inner shaft portion 49 and the outer shaft portion 55 which covers an outer side of the inner shaft portion 49. The outer shaft portion 55 has a tubular shape extending in the flow direction and having both ends open. The outer shaft portion 55 has a plate-shaped mounting portion 56 at the downstream end portion. The outer shaft portion 55 is inserted from the upstream side with respect to the inner barrel portion 46 and the mounting portion 56 is located at an intermediate portion of the inner barrel portion 46 in the flow direction.

An outer shaft support portion 57 curved so as to bulge outward in the radial direction is formed in the upstream portion of the outer shaft portion 55. An outer surface of the outer shaft support portion 57 has a spherical shape. The outer shaft support portion 57 is tiltably supported by the pair of shims 18 with respect to the downstream portion of the damper base 16.

Figure 7:
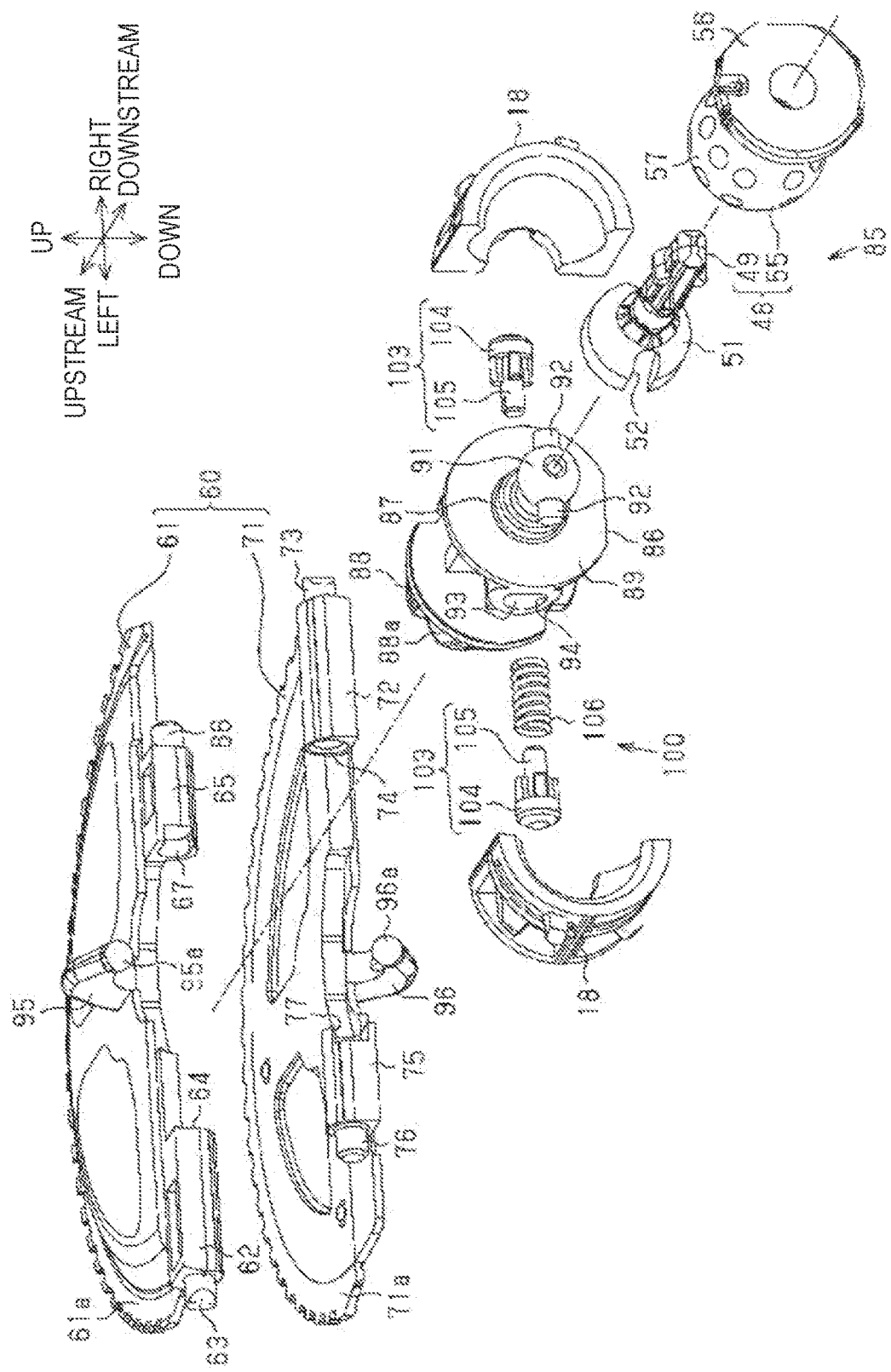
FIG. 7 is an exploded perspective view of some of the components of the air-conditioning register of FIG. 1.

As illustrated in FIGS. 2, 3, and 7, a downstream portion of the inner shaft portion 49 projects downstream from the outer shaft portion 55. An inner shaft support portion 51 is formed in the upstream portion of the inner shaft portion 49. The inner shaft support portion 51 has a shape which can be fitted from the inside to the outer shaft support portion 57 of the outer shaft portion 55, more specifically, a shape which is curved so as to bulge outward in the radial direction. A pair of engaging groove portions 52 are formed at locations facing each other in the radial direction of the inner shaft support portion 51. Each engaging groove portion 52 extends from an upstream end surface of the inner shaft support portion 51 to a vicinity of the central portion.

Shut Damper 60

As illustrated in FIGS. 3, 4, and 7, the shut damper 60 is a member corresponding to a movable fin in the claims. The shut damper 60 is arranged at a location further on an upstream side than the load generating mechanism 100 and upstream portion of the damper base 16 in the retainer 11 in the flow direction described above. The shut damper 60 includes a damper plate 61 on an upper side and a damper plate 71 on a lower side. Each of the damper plates 61 and 71 has a substantially semicircular plate shape. Seal portions 61a and 71a, which are thinner and more flexible than the other parts of the damper plates 61 and 71, are formed at locations around the damper plates 61 and 71 and in contact with the inner wall surface of the outer cylinder portion 14.

As illustrated in FIGS. 4 and 7, an outer shaft support portion 62 is formed at a left end portion of the damper plate 61 on the upper side. An outer damper shaft 63 protruding to the left is formed at a left end portion of the outer shaft support portion 62 and a recess 64 is formed at a right end portion. An outer shaft support portion 72 is formed at a right end portion of the damper plate 71 on the lower side. An outer damper shaft 73 protruding to the right is formed at a right end portion of the outer shaft support portion 72 and a recess 74 is formed at a left end portion.

In the damper plate 61 on the upper side, an inner shaft support portion 65 is formed at a location adjacent to the left side of the outer shaft support portion 72. An inner damper shaft 66 protruding to the right is formed at a right end portion of the inner shaft support portion 65 and a recess 67 is formed at a left end portion. In the damper plate 71 on the lower side, an inner shaft support portion 75 is formed at a location adjacent to the right side of the outer shaft support portion 62. An inner damper shaft 76 protruding to the left is formed at a left end portion of the inner shaft support portion 75 and a recess 77 is formed at a right end portion.

Then, the inner damper shaft 66 is engaged with the recess 74 and the inner damper shaft 76 is engaged with the recess 64, in such a manner that both damper plates 61 and 71 are connected to each other so as to be tiltable to form the shut damper 60.

Both outer damper shafts 63 and 73 are respectively engaged with bearing portions 78 provided on the left side portion and the right side portion of the outer cylinder portion 14. Due to these engagements, the shut damper 60 is tiltably supported with respect to the retainer 11. The outer damper shafts 63 and 73 and the inner damper shafts 66 and 76 form a damper shaft within the scope of the claims.

Further, corresponding shaft portions 19 of the damper base 16 are engaged with both recesses 67 and 77 of the shut damper 60 (see FIG. 9). Due to these engagements, the shut damper 60 is tiltably supported with respect to the damper base 16.

The damper plates 61 and 71 can be tilted in opposite directions between the fully open position indicated by the solid line in FIG. 3 and a fully closed position indicated by the two-dot chain line in FIG. 3 with its own outer damper shafts 63 and 73 and the inner damper shafts 66 and 76 as fulcrums. Although not illustrated, each of the damper plates 61 and 71 can be stationary at an intermediate position between the fully open position and the fully closed position.

In addition, contrary to the above, the inner damper shafts 66 and 76 are provided in the outer shaft support portion 62 and 72 and the recesses 64 and 74 are provided in the inner shaft support portion 65 and 75, and further the inner damper shafts 66 and 76 are engaged with the recesses 64 and 74, in such a manner that both damper plates 61 and 71 may be connected to each other so as to be tiltable.

Also, contrary to the above, the outer damper shafts 63 and 73 are provided on the outer cylinder portion 14 and bearing portions are provided on the outer shaft support portions 62 and 72, in such a manner that the shut damper 60 may be tiltably supported by the outer cylinder portion 14 by the bearing portion and the outer damper shafts 63 and 73.

Operation Knob 81

As illustrated in FIGS. 1, 3, and 4, the operation knob 81 is a member operated by an occupant when tilting the barrel 41 and tilting the shut damper 60. The operation knob 81 includes a knob body 82 and a cap 83. The knob body 82 is rotatably mounted from the downstream side with respect to the inner barrel portion 46. Most parts of the knob body 82 are located further on the downstream side than the inner barrel portion 46. The knob body 82 is integrally rotatably attached to the downstream portion of the inner shaft portion 49. The cap 83 is attached to the knob body 82 so as to be integrally rotatable from the downstream side.

Transmission Mechanism 85

As illustrated in FIGS. 3, 4, and 7, the transmission mechanism 85 is a mechanism for transmitting rotation of the operation knob 81 to the shut damper 60 to tilt the shut damper 60. The transmission mechanism 85 includes the shaft 48, a damper drive 86, and a pair of arm portions 95 and 96. The damper drive 86 is arranged inside the damper base 16 so as to extend along the central axis CL1 in the ventilation passage 12.

As illustrated in FIGS. 3, 7, and 9, the damper drive 86 includes a rotation support portion 87 and a cam portion 88 formed further on the upstream side than the rotation support portion 87. A flange portion 89 (see FIG. 12) is formed on an outer peripheral surface of an intermediate portion of the rotation support portion 87 in the flow direction over the entire circumference. The flange portion 89 is in contact with both shims 18 from the upstream side.

As illustrated in FIGS. 2, 7, and 9, a part of the rotation support portion 87, which is the portion located further on the downstream side than the flange portion 89, is inserted between the two shims 18. A spherical portion 91 is formed at a downstream end portion of the rotation support portion 87. The spherical portion 91 is engaged with the inner shaft support portion 51 from the inside. Therefore, the shaft 48 can be tilted with respect to the spherical portion 91 with the inner shaft support portion 51 and the outer shaft support portion 57 as fulcrums.

A pair of transmission pins 92 which protrude in a radial direction and in opposite directions are formed on an outer peripheral surface of the spherical portion 91. Both transmission pins 92 are engaged with corresponding engaging groove portions 52 of the inner shaft support portion 51 described above. Therefore, the rotation of the shaft 48 can be transmitted to the damper drive 86 via the engaging groove portion 52 and the transmission pin 92.

As illustrated in FIGS. 3, 7, and 9, the rotation support portion 87 has an accommodation portion 93 extending in the radial direction at a location adjacent to the upstream side of the flange portion 89. The accommodation portion 93 has open ends 94 at both end portions in the radial direction.

One arm portion 95 is provided on the damper plate 61 on the upper side and the other arm portion 96 is provided on the damper plate 71 on the lower side. The arm portion 95 extends from the intermediate portion in the left-right direction to the downstream side in the damper plate 61. The arm portion 95 includes a sliding end portion 95a having a spherical surface at a downstream end portion. The arm portion 96 extends from the intermediate portion in the left-right direction to the downstream side in the damper plate 71. The arm portion 96 includes a sliding end portion % a having a spherical surface at a downstream end portion.

The cam portion 88 has a cam groove 88a on the outer surface. In the embodiment, the cam groove 88a is formed on an outer surface of the cam portion 88 over the entire circumference and has an endless shape. Then, the sliding end portions 95a and 96a are slidably engaged with the cam groove 88a. The cam groove 88a does not have to be endless. The cam groove 88a with which the sliding end portion 95a is engaged and the cam groove 88a with which the sliding end portion 96a is engaged may be formed separately.

Load Generating Mechanism 100

Figure 8:
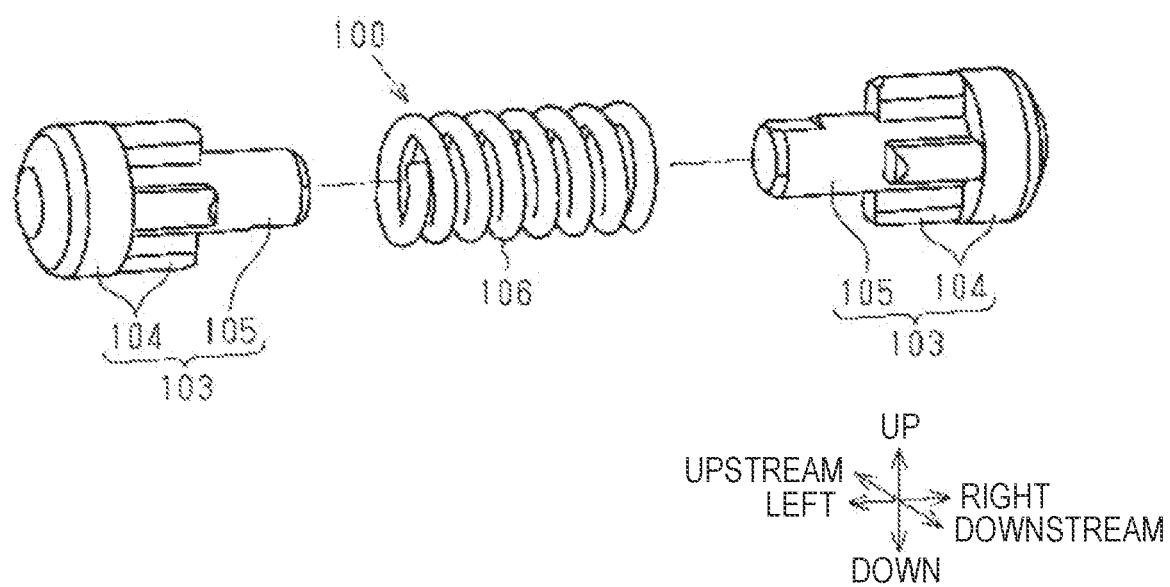
FIG. 8 is an exploded perspective view of some of the components in a load generating mechanism of the embodiment.
Figure 11:
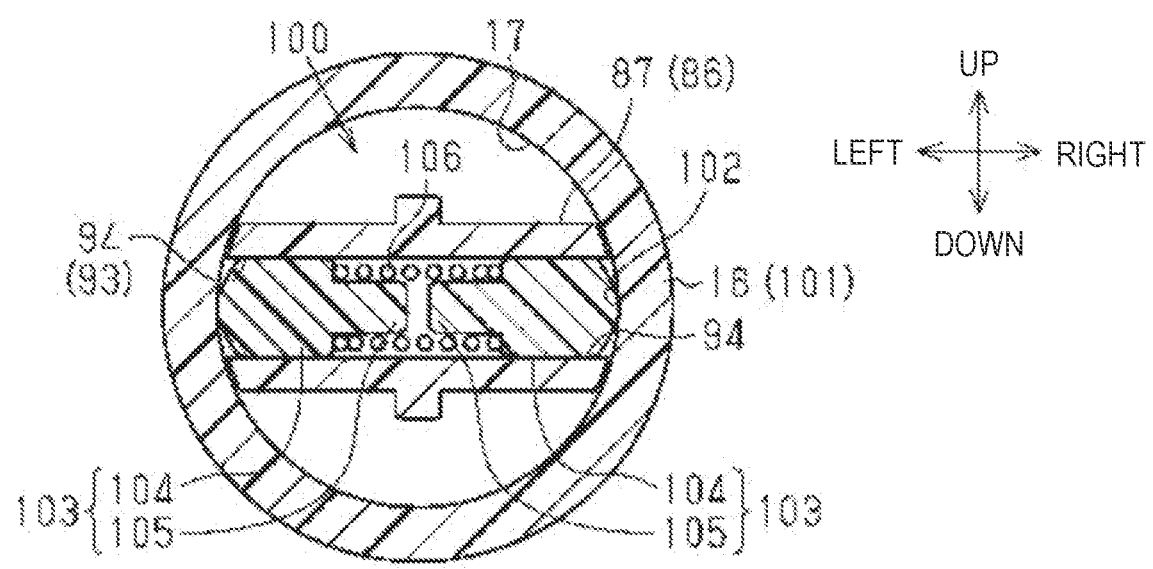
FIG. 11 is a cross-sectional view taken along the line 11-11 in FIG. 9.
Figure 12:
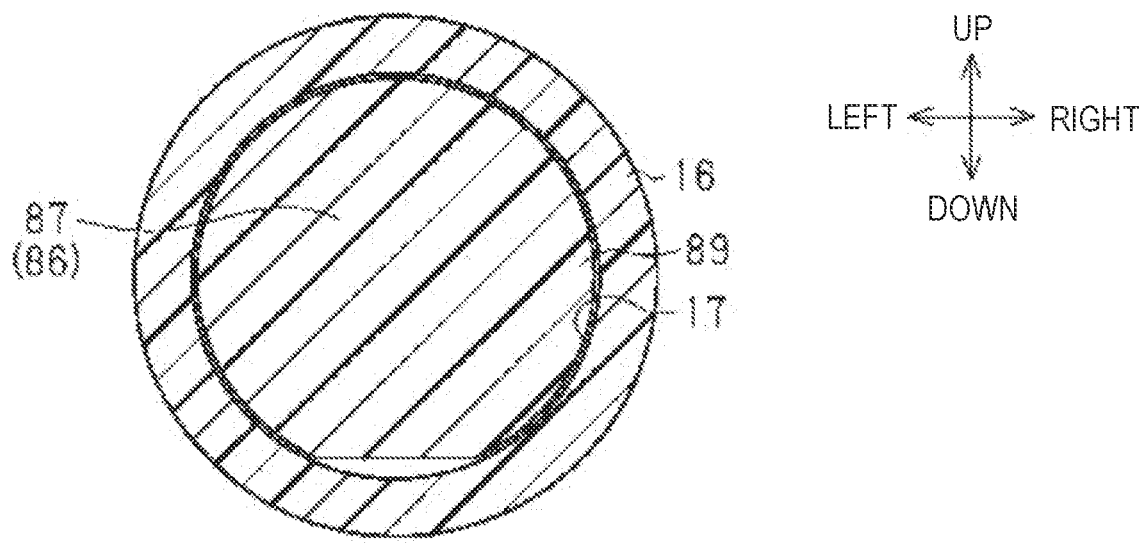
FIG. 12 is a cross-sectional view taken along the line 12-12 in FIG. 9.

As illustrated in FIGS. 8, 9, and 11, the load generating mechanism 100 is provided in the middle of a force transmission path in the transmission mechanism 85. The load generating mechanism 100 includes a pressure receiving portion 101 having a pressure receiving surface 102, a pair of pressing members 103, and a spring 106.

The pressure receiving portion 101 is composed of a part of the damper base 16 and is non-rotatable. The pressure receiving surface 102 is composed of a part of the cylindrical inner wall surface 17 of the damper base 16. Each pressing member 103 includes a pressing body portion 104 which is arranged at a location adjacent to an end portion of the spring 106 and is pressed against the pressure receiving surface 102 by the spring 106. Further, each pressing member 103 includes an insertion portion 105 extending from each pressing body portion 104 toward the radial direction of the damper drive 86, in other words, extending toward the other pressing member 103 side.

Each pressing member 103 is made of a hard resin material. In the embodiment, polyacetal (POM) is used as the resin material, but a hard resin material different from this may be used.

Each pressing member 103 is provided so as to be movable in the direction of approaching and separating from the pressure receiving surface 102. Further, each pressing member 103 is configured to rotate together with the damper drive 86 as the operation knob 81 rotates. In this embodiment, two pressing members 103 are used. These pressing members 103 are arranged at both end portions of the accommodation portion 93 in the radial direction.

The spring 106 is composed of a coil spring. The spring 106 is arranged in a compressed state between the two pressing body portions 104 in the accommodation portion 93. The insertion portions 105 in the respective pressing members 103 are inserted into both end portions of the spring 106. The spring 106 urges each pressing member 103 toward a side (outward in the radial direction) approaching the pressure receiving surface 102 and presses the pressing body portion 104 against the pressure receiving surface 102. The pressing body portion 104 of each pressing member 103 is directly in contact with the pressure receiving surface 102 to generate a load.

Next, an operation of the embodiment configured as described above will be described. In addition, effects caused by the operation will also be described.

The two-dot chain line in FIG. 3 illustrates a state when both damper plates 61 and 71 are in the fully closed position. In this state, the damper plate 61 on the upper side is inclined so as to be higher toward the upstream side and comes into contact with an upper part of the inner wall surface of the outer cylinder portion 14 at the seal portion 61a. The damper plate 71 on the lower side is inclined so as to be lower toward the upstream side and comes into contact with a lower part of the inner wall surface of the outer cylinder portion 14 at the seal portion 71a. Both damper plates 61 and 71 are in a bent state with the outer damper shafts 63 and 73 and the inner damper shafts 66 and 76 as fulcrums. The ventilation passage 12 is closed by both damper plates 61 and 71. The flow of air-conditioning air A1 is blocked in a portion of the ventilation passage 12, which is the portion further on the downstream side than both damper plates 61 and 71, and thus blown-out of the air-conditioning air A1 from the outlet 27 is stopped.

On the other hand, the solid line in FIG. 3 illustrates a state when both damper plates 61 and 71 are in the fully open position. In this state, both the damper plates 61 and 71 are substantially parallel to the central axis CL1. Both damper plates 61 and 71 are in a state of overlapping in the up-down direction and the ventilation passage 12 is greatly opened. The air-conditioning air A1 flows separately on the upper side of the damper plate 61 and the lower side of the damper plate 71. A part of the air-conditioning air A1 which passes through both damper plates 61 and 71 flows along the outer barrel portion 42, the intermediate barrel portion 45, the inner barrel portion 46, the support fin portion 47, and the like in the barrel 41, and then blows out from the outlet 27.

Although not illustrated, both damper plates 61 and 71 can be held at an inclination angle intermediate between the fully closed position and the fully open position. In this case, a part of the air-conditioning air A1 passes between the damper plates 61 and 71 and the inner wall surface of the outer cylinder portion 14 and flows downstream from the damper plates 61 and 71. The air-conditioning air A1 flows along each part of the barrel 41 and then blows out from the outlet 27 in the same manner as described above.

As illustrated in FIGS. 9 and 11, in the load generating mechanism 100, each pressing member 103 urged outward (the side approaching the pressure receiving surface 102) in the radial direction by the spring 106 is pressed against the air pressure receiving surface 102 of the pressure receiving portion 101. A load due to friction is generated between each pressing member 103 and the pressure receiving surface 102.

The air-conditioning air A1 supplied to the retainer 11 tries to tilt both damper plates 61 and 71. In this case, when the force applied from the air-conditioning air A1 to both damper plates 61 and 71 does not overcome the friction, the damper plates 61 and 71 are not tilted and are maintained at the tilt angle at that time. The same applies when a force for rotating the operation knob 81 is applied and the force does not overcome the friction. The operation knob 81 is not rotated.

The tilt angle of the shut damper 60 is changed through a rotation operation of the operation knob 81 as illustrated in FIGS. 3 and 4. This change also includes switching from the fully closed position to the fully open position and switching from the fully open position to the fully closed position.

When a force is applied to the operation knob 81 to rotate the operation knob 81 and if the force overcomes the friction, the operation knob 81 rotates and the pressing member 103 rotates (slides) in a state where the pressing member 103 is pressed against the pressure receiving surface 102. At the time of this rotation, an operation load is applied to the operation knob 81 by the load generated between the pressing member 103 and the pressure receiving surface 102.

Further, the rotation of the operation knob 81 is transmitted to the damper plates 61 and 71 via the transmission mechanism 85 and the damper plates 61 and 71 are tilted. More specifically, the rotation of the knob body 82 is transmitted to the damper drive 86 via the shaft 48 (outer shaft portion 55, inner shaft portion 49). Between the inner shaft portion 49 and the damper drive 86, the transmission of rotation is done via the engaging groove portion 52 and the transmission pin 92. The damper drive 86 rotates within the damper base 16 with the cam portion 88.

As the cam portion 88 rotates, positions of the sliding end portions 95a and 96a in the arm portions 95 and 96, where the sliding end portions 95a and 96a engage with the cam groove 88a, change. As the engagement position changes, the damper plates 61 and 71 are tilted in opposite directions with the damper shaft as a fulcrum, that is, both outer damper shafts 63 and 73 and both inner damper shafts 66 and 76 as fulcrums. The operation knob 81 and both damper plates 61 and 71 have different rotation and tilt directions. However, by passing through the transmission mechanism 85 as described above, the direction of rotation of the operation knob 81 is changed and transmitted to the damper plates 61 and 71. As a result, the damper plates 61 and 71 are respectively tilted. Due to these tilts, the opening degree of the ventilation passage 12 changes. The amount of air-conditioning air A1 passing through the shut damper 60 in the ventilation passage 12 can be adjusted. At the time of these tilts, a tilt load (torque) is applied to the damper plates 61 and 71 by the load generated between the pressing member 103 and the pressure receiving surface 102.

Here, in the embodiment, the pressing member 103 and the pressure receiving portion 101 are each formed of a hard resin material and the pressing member 103 is in direct contact with the pressure receiving surface 102. The pressing member 103 and the pressure receiving portion 101 are less susceptible to the influence of air temperature than when an elastic body is interposed between them (JP-A-2017-43172 corresponds to this). Therefore, even when the air-conditioning register 10 is used at the times of different air temperatures or in areas of different air temperatures, the load generated by the load generating mechanism 100 is stable. As a result, the operation load when rotating the operation knob 81 is stabilized and the operation feeling is improved. Further, it is unlikely that the tilt load (torque) becomes smaller than the appropriate value. It is possible to prevent the air-conditioning air A1 flowing through the ventilation passage 12 from tilting the damper plates 61 and 71 to a tilt angle different from the tilt angle set by the operation of the operation knob 81.

When a force is applied to the operation knob 81 in the up-down direction, the left-right direction, and diagonally upward or diagonally downward, the movement is transmitted to other parts of the barrel 41 and to the shaft 48 via the inner barrel portion 46. As illustrated by the two-dot chain line in FIGS. 3 and 4, the barrel 41 tilts toward the operated side of the operation knob 81 with the spherical portion 91 of the damper drive 86 engaged in the inner shaft support portion 51 of the shaft 48 as a fulcrum.

The operation knob 81 and each part of the barrel 41 are in an inclined state with respect to the central axis CL1. The air-conditioning air A1 flows along each part of the barrel 41 inclined as described above, so that the air-conditioning air A1 can change its direction and be blown out from the outlet 27.

According to this embodiment, the following effects can be obtained in addition to the above.

In this embodiment, as illustrated in FIGS. 8 and 9, two pressing members 103 arranged in the accommodation portion 93 are urged by the spring 106 to move away from each other. Each pressing member 103 is exposed from the open ends 94 of the accommodation portion 93 and pressed against the pressure receiving surface 102.

Therefore, in the cylindrical pressure receiving surface 102, a load due to friction can be generated at two locations located on opposite sides in the radial direction with the damper drive 86 interposed therebetween.

In order to generate a load in response to the rotation of the operation knob 81, it is conceivable to attach pressing members formed by pressing a metal plate to both ends of the spring. In this case, it is difficult to process the metal plate into a complicated shape by press working. Therefore, the pressing member consists only of the pressing body portion described above and the pressing body portion is processed into a cap shape. In order to attach this metal pressing member to the end portion of the spring, a process of applying an inward force in the radial direction to a plurality of locations on the peripheral wall portion of the pressing member to deform the locations and lock them to the spring, a so-called caulking process, is required.

However, the caulking process takes time and effort and the manufacturing cost of the load generating mechanism increases accordingly. Moreover, it is difficult to evenly caulk a plurality of locations of the peripheral wall portion of the pressing member. In addition, in the peripheral wall portion of the pressing member, gaps between the caulked locations and the spring vary among the locations. Due to this variation, the variation in load generated between the pressing member and the pressure receiving surface may increase.

In this respect, in the embodiment, each pressing member 103 is formed of a resin material. The manufacturing cost can be reduced by resinifying the pressing member 103.

Further, when each pressing member 103 is resin-molded, it is possible to mold even when it has a more complicated shape than the case of pressing as described above. It is difficult to form the pressing body portion 104 and the insertion portion 105 by press working, but it can be formed by resin molding. Therefore, it is possible to further reduce the manufacturing cost of the load generating mechanism 100.

Further, in the embodiment, the pressing member 103 is composed of the pressing body portion 104 which is pressed against the pressure receiving surface 102 to generate a load and the insertion portion 105 for locking to the end portion of the spring 106. Therefore, the pressing member 103 can be attached to the spring 106 simply by inserting the insertion portion 105 into the end portion of the spring 106.

In this embodiment, the insertion portion 105 is simply inserted into the end portion of the spring 106 and is not subjected to caulking. Therefore, the above problem due to caulking is solved. That is, the variation in the load generated between the pressing body portion 104 and the pressure receiving surface 102 can be reduced.

The embodiment described above can also be implemented as a modification example in which this is modified as follows. The above-described embodiment and the following modification examples can be implemented in combination with each other within a technically consistent range.

Load Generating Mechanism 100

Figure 13:
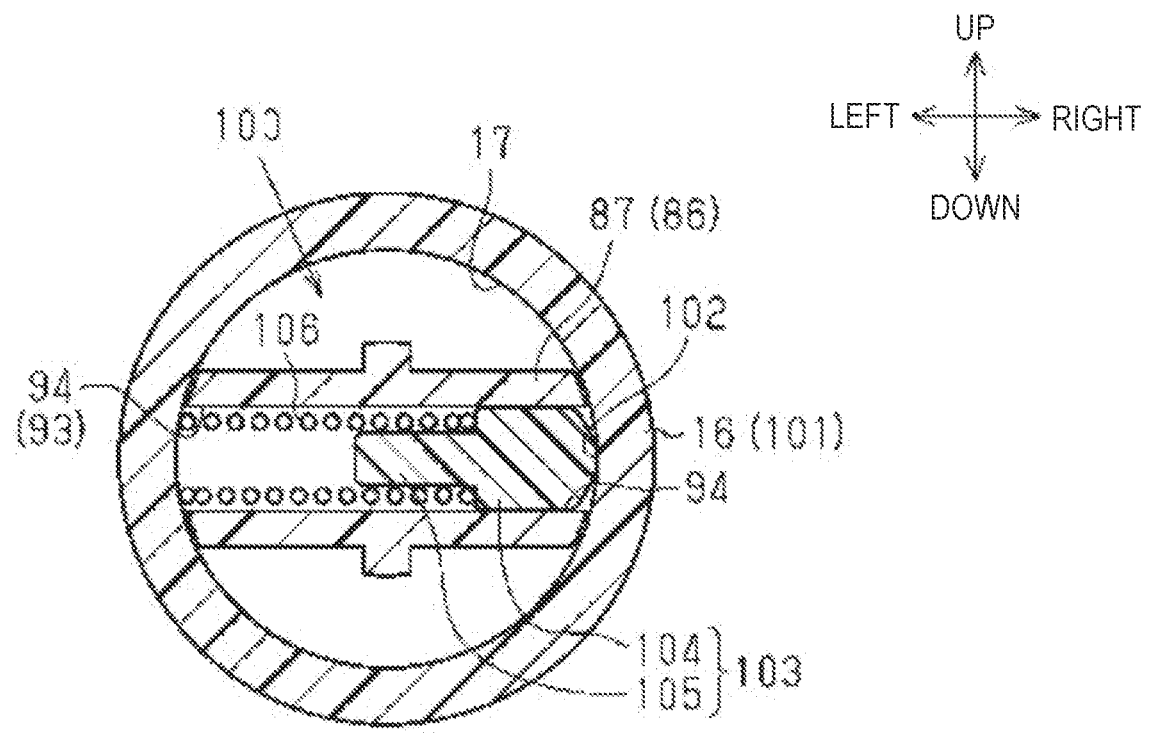
FIG. 13 is a view corresponding to FIG. 11 and is a cross-sectional view illustrating a modification example of the load generating mechanism.
Figure 14:
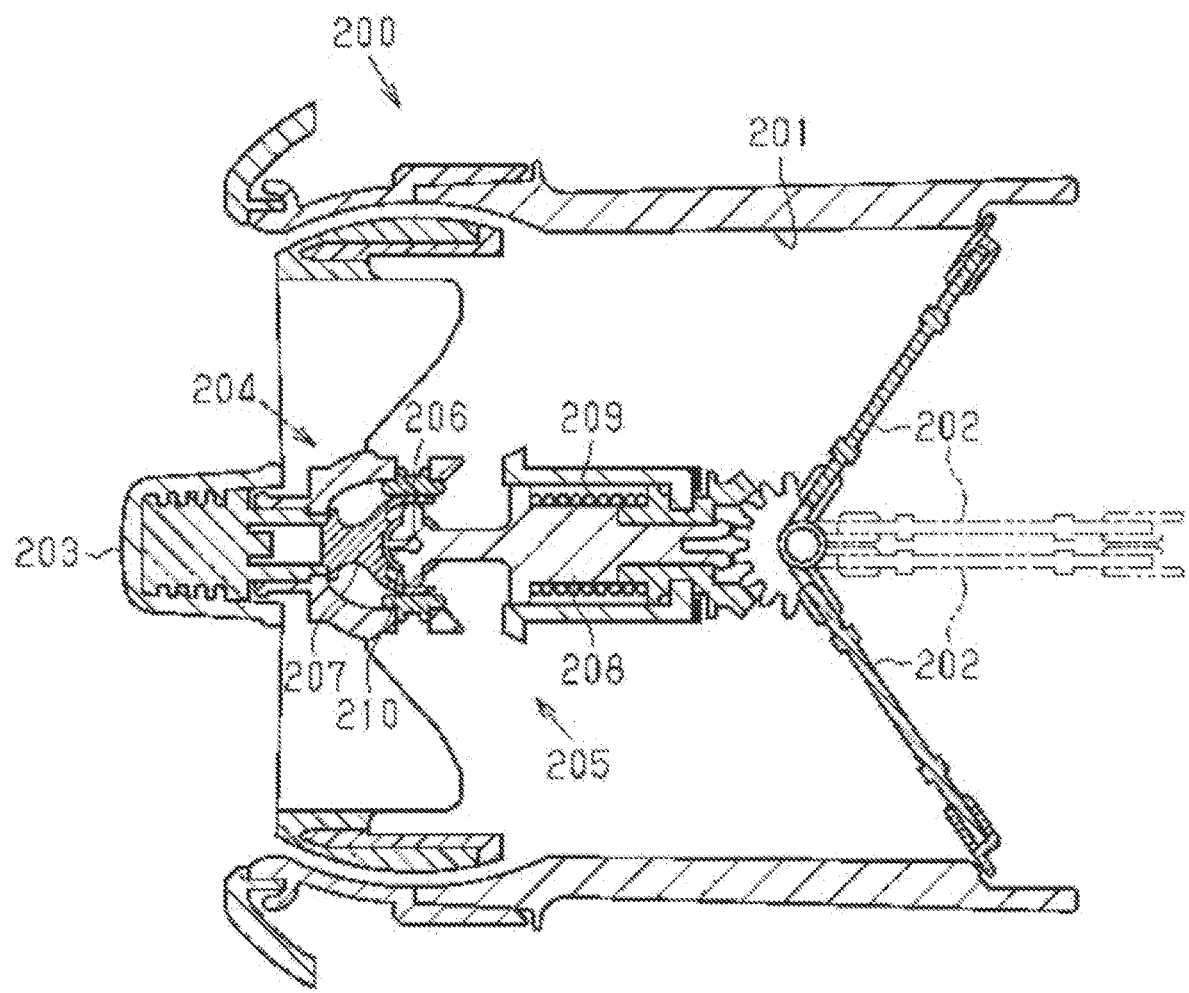
FIG. 14 is a side cross-sectional view illustrating an internal structure of an air-conditioning register of the related art.

As illustrated in FIG. 13, only one pressing member 103 may be arranged in the accommodation portion 93. In this case, the spring 106 urges the pressing member 103 to expose a part of the pressing body portion 104 from the open end 94 on one side (right side in FIG. 13) of the accommodation portion 93 and press the pressing member 103 against the pressure receiving surface 102. A load due to friction is generated between the pressure receiving surface 102 and the pressing member 103. The end portion of the spring 106 on the opposite side to the pressing member 103 is exposed from the open end 94 on the other side (left side in FIG. 13) of the accommodation portion 93 and comes into contact with the pressure receiving surface 102.

By the way, in the above-described embodiment using two pressing member 103, when manufacturing the load generating mechanism 100, it is necessary to push both pressing members 103 toward each other to immerse them in the accommodation portion 93 against the elastic force of the spring 106, and then in this state, insert the damper drive 86 into the damper base 16.

On the other hand, in the above-described modification example using only one pressing member 103, it is only necessary to push one pressing member 103 into the accommodation portion 93, so that the incorporation work can be improved.

Unlike the above-described embodiment and the modification example of FIG. 13, the accommodation portion 93 does not necessarily have to penetrate the rotation support portion 87 of the damper drive 86 in the radial direction. In this case, the accommodation portion 93 has the open end 94 at only one end. The accommodation portion 93 has a bottom portion at the other end. One pressing member 103 is arranged for every accommodation portion 93. Then, the spring 106 is arranged between the bottom portion of the accommodation portion 93 and the pressing member 103. In this modification example, a portion of the pressing member 103 urged by the spring 106 is exposed from the open end 94 and comes into contact with the pressure receiving surface 102. A load due to friction is generated at the contact portion between the pressing member 103 and the pressure receiving surface 102.

The accommodation portions 93 each having the open end 94 at one end and the bottom portion at the other end may be provided at a plurality of locations of rotation support portion 87 and the pressing member 103 and the spring 106 may be arranged for each accommodation portion 93. When a plurality of accommodation portions 93 are provided, the accommodation portions 93 may be provided so as to extend radially from the axis of the rotation support portion 87.

Operation Knob 81

The operation knob 81 may be provided at least rotatably. Therefore, the operation knob 81 may only rotate without tilting with the spherical portion 91 as a fulcrum.

The operation knob 81 may be arranged outside instead of inside the retainer, provided that the rotation of the operation knob 81 is transmitted to the movable fin via the transmission mechanism 85.

Barrel 41

As the barrel 41, a tubular one in which at least the outer barrel portion 42 has a shape different from the cylindrical shape, for example, a square-cylindrical one may be used.

As the barrel 41, one that is tiltably supported by the retainer by the barrel axis may be used.

Other

The above-described air-conditioning register is also applicable to a type of the air-conditioning register in which the shut damper 60 is composed of one damper plate and the damper plate is supported so as to be tiltable to the retainer by an axis.

The air-conditioning register is also applicable to a type of the air-conditioning register in which the air-conditioning register has movable fins which change the flow direction of the air-conditioning air A1 and the rotation of the operation knob 81 is transmitted to the movable fin to tilt the movable fin.

Examples of the target air-conditioning register include a cross-fin type air-conditioning register. In this type of air-conditioning register, as a member which changes the flow direction of the air-conditioning air, a plate-shaped upstream fin extending in a direction intersecting the flow direction of the air-conditioning air and a plate-shaped downstream fin extending in a direction different from the extending direction of the upstream fin and intersecting the flow direction are provided. For example, the upstream fins extend in the left-right direction (vehicle width) and the downstream fins extend in the up-down direction. The upstream fin tilts with the upstream fin shafts provided at both end portions in the extending direction of the upstream fin as fulcrums. The downstream fin tilts with the downstream fin shafts provided at both end portions in the extending direction of the downstream fin as fulcrums. The flow direction of the air-conditioning air is changed by the tilt of each of the upstream fin and the downstream fin.

The cross-fin type air-conditioning register having such a configuration is provided with the transmission mechanism 85 and the load generating mechanism 100 as in the embodiment described above, whereby, similar to the embodiment described above, the effect of stabilizing the load generated by the load generating mechanism 100 can be obtained.

The air-conditioning register 10 described above can also be applied to an air-conditioning register provided in a place different from the instrument panel in the passenger compartment.

The air-conditioning register described above can be widely applied not only to vehicles but also to others as long as the rotation of the operation knob can be transmitted to the movable fins by the transmission mechanism to tilt the movable fins.

What is claimed is:

1. An air-conditioning register comprising:
a shut damper which is tiltably placed in a ventilation passage for air-conditioning air in a retainer;
an operation knob provided at least rotatably at a location away from the shut damper; and
a transmission mechanism which transmits rotation of the operation knob to the shut damper and tilts the shut damper, wherein:
a load generating mechanism is provided in a middle of a force transmission path in the transmission mechanism;
the load generating mechanism includes a pressure receiving portion, a pressing member, and a spring;
the pressure receiving portion has a pressure receiving surface;
the pressing member rotates with respect to the pressure receiving portion as the operation knob rotates;
the spring generates a load between the pressing member and the pressure receiving portion by urging the pressing member toward a side approaching the pressure receiving surface and pressing the pressing member against the pressure receiving surface; and
the pressing member and the pressure receiving portion are each formed of a hard resin material and the pressing member is directly in contact with the pressure receiving surface to generate the load.

2. The air-conditioning register according to claim 1, wherein:
the pressure receiving portion has a cylindrical shape extending along a central axis of the ventilation passage and has a cylindrical inner wall surface;
the pressure receiving portion has the pressure receiving surface on its inner wall surface;
inside the pressure receiving portion, a damper drive which extends along the central axis and which rotates by receiving transmission of the rotation of the operation knob is arranged to tilt the shut damper;
the damper drive has an accommodation portion extending in a radial direction of the damper drive;
the accommodation portion has an open end which is open and faces the pressure receiving surface at at least one end portion in the radial direction; and
the pressing member and the spring are arranged in the accommodation portion.

3. The air-conditioning register according to claim 2, wherein:
the pressing member is one pressing member of a pair of pressing members;
the accommodation portion has the open ends at both end portions in the radial direction;
the one pressing member is placed in the accommodation portion; and
the spring urges the one pressing member to expose a part of the one pressing member from one open end of the accommodation portion and press it against the pressure receiving surface.

4. The air-conditioning register according to claim 2, wherein:
the pressing member is one pressing member of a pair of pressing members;
the accommodation portion has the open ends at both end portions in the radial direction; and
the pair of pressing members are located at both end portions of the accommodation portion in the radial direction and the spring is located between both pressing members in the accommodation portion.

5. The air-conditioning register according to claim 2, wherein:
the spring is composed of a coil spring; and
the pressing member includes a pressing body portion arranged at a location adjacent to an end portion of the spring and an insertion portion extending radially from the pressing body portion and being inserted into the end portion of the spring.

6. The air-conditioning register according to claim 1, wherein:
the shut damper is arranged further on an upstream side than the load generating mechanism in a flow direction of the air-conditioning air; and
the shut damper includes a pair of damper plates which are tilted in opposite directions with a damper axis as a fulcrum by a force transmitted from the transmission mechanism to open and close the ventilation passage.

* * * * *